United States Patent
Bohrer et al.

(10) Patent No.: US 7,666,935 B2
(45) Date of Patent: Feb. 23, 2010

(54) STABILISATION OF AQUEOUS SOLUTIONS OF HOMOPOLYMERS AND COPOLYMERS OF N-VINYLPYRROLIDONES

(75) Inventors: Erik Bohrer, Maxdorf (DE); Dieter Faul, Niederkirchen (DE); Ivette Garcia Castro, Ludwigshafen Gartenstadt (DE); Norbert Gebhardt, Neustadt (DE); Peter Hössel, Schifferstadt (DE); Peter Mendera, Dannstadt-Schauernheim (DE); Olga Pinneker, Hessheim (DE); Bernd de Potzolli, Bad Dürkheim (DE); Stefan Stein, Wörrstadt (DE); Karl-Hermann Strube, Speyer (DE); Ralf Widmaier, Mannheim (DE); Josef Neutzner, Neustadt (DE); Simone Lehnert, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/576,612

(22) PCT Filed: Oct. 6, 2005

(86) PCT No.: PCT/EP2005/010763

§ 371 (c)(1),
(2), (4) Date: Apr. 4, 2007

(87) PCT Pub. No.: WO2006/040067

PCT Pub. Date: Apr. 20, 2006

(65) Prior Publication Data

US 2008/0033091 A1    Feb. 7, 2008

(30) Foreign Application Priority Data

Oct. 8, 2004    (DE) .................... 10 2004 049 344

(51) Int. Cl.
*C08K 3/00* (2006.01)
(52) U.S. Cl. .................... 524/401; 524/516; 524/548
(58) Field of Classification Search ................ 524/401, 524/516, 548
See application file for complete search history.

(56) References Cited

U.S. PATENT DOCUMENTS

| 2,821,519 | A | 1/1958 | Glickman |
| 3,480,557 | A | 11/1969 | Shiraeff |
| 4,786,699 | A | 11/1988 | Nuber et al. |
| 5,130,124 | A | 7/1992 | Merianos et al. |
| 5,753,770 | A | 5/1998 | Breitenbach et al. |

FOREIGN PATENT DOCUMENTS

| DE | 43 44 131 | 6/1995 |
| WO | WO-98/58990 | 12/1998 |

*Primary Examiner*—Peter D Mulcahy
(74) *Attorney, Agent, or Firm*—Connolly Bove Lodge & Hutz LLP

(57) ABSTRACT

Aqueous solutions comprising: one or more polymeric components selected from the group consisting of homopolymers of N-vinylpyrrolidone, copolymers of N-vinylpyrrolidone, and mixtures thereof; and hydrogen peroxide; wherein the hydrogen peroxide is present in an amount of 100 to 5000 ppm; and methods of stabilizing aqueous solutions containing one or more polymeric components selected from the group consisting of homopolymers of N-vinylpyrrolidone, copolymers of N-vinylpyrrolidone, and mixtures thereof.

24 Claims, No Drawings

STABILISATION OF AQUEOUS SOLUTIONS OF HOMOPOLYMERS AND COPOLYMERS OF N-VINYLPYRROLIDONES

CROSS-REFERENCE TO RELATED APPLICATIONS

This application is a national stage application, under 35 U.S.C. §371, of PCT/EP2005/010763, filed Oct. 6, 2005, which claims priority of German Application No. 10 2004 049 344.8, filed Oct. 8, 2004.

BACKGROUND OF THE INVENTION

The present invention relates to an improved physical stabilization of aqueous solutions of homopolymers and copolymers of N-vinylpyrrolidone with hydrogen peroxide, and to a method of producing such solutions.

Homopolymers and copolymers of N-vinylpyrrolidone are used for a large number of applications in the form of their aqueous solutions. Such solutions are generally stored by the user for a certain time. This requires stabilization with regard to the physical properties of the solutions, i.e. with regard to odor, color, opacity. Stabilization with regard to the viscosity is also important for the application properties of such solutions. An important aspect of the stabilization here is also stabilization against short-term thermal stresses. Thermal stresses can, for example, lead to the color being impaired, which is evident from an increase in the iodine color number. In addition, even after further working the polymer solutions to give aqueous systems such as, for example, gels, the physical stability of the polymers should be ensured without resulting in the properties of the secondary products being adversely affected. At the same time, such solutions must, however, also be protected against bacterial attack.

The use of hydrogen peroxide with N-vinylpyrrolidone homopolymers or copolymers in aqueous solutions for producing complexes for disinfectants is known per se. For this, firstly solutions of the polymers with H2O2 are prepared, which are then converted to the pulverulent complexes. Such products comprise complex-bound hydrogen peroxide in the percentage range. Such complexes are described, for example, in DE-A 43 44 131.

However, it was feared that the use of hydrogen peroxide in solutions of corresponding polymers could lead to the crosslinking of these polymers since hydrogen peroxide is also used for producing crosslinked PVP. Thus, it is known, for example, from WO 98/58990 that polyvinylpyrrolidone can be crosslinked with hydrogen peroxide.

Furthermore, it is known that aqueous solutions of such polymers can be stabilized with alkyl parabens. Although such parabens are approved for applications such as, for example, cosmetics, they also have applications-related disadvantages. Particularly with low molecular weight VP polymers, compatibility is low. Furthermore, turbidity has been observed, meaning that products stabilized in this way do not appear to be suitable for applications such as, for example, hair gels. Added to this is the fact that such compositions often have to be used for effective stabilization in amounts in the percentage range and furthermore are present in the end product in unchanged amounts. Allergic reactions to such compositions can also not be ruled out.

BRIEF SUMMARY OF THE INVENTION

It was an object of the present invention to find an improved method for stabilizing polymer solutions.

Accordingly, aqueous polymer solutions of homopolymers and copolymers of N-vinylpyrrolidone have been found which, for stabilization, are adjusted to a content of hydrogen peroxide of from 100 to 5000 ppm.

Furthermore, a method of producing such stabilized solutions has been found wherein the aqueous polymer solutions are adjusted with aqueous hydrogen peroxide to a content of from 100 to 5000 ppm of hydrogen peroxide.

DETAILED DESCRIPTION OF THE INVENTION

Preferably, enough hydrogen peroxide is added to the polymer solutions for 100 to 2500 ppm to be present. These data refer to the starting content, i.e. the content measurable after two days following addition. Depending on the thermal stress or other influences, the measurable content can decrease upon prolonged storage. However, the stabilizing effect is retained over an extended period.

The amount of hydrogen peroxide used can be governed by the type of polymer in the solution. In the case of polymers which comprise, for example, quaternized N-vinylimidazole as comonomer, just relatively small amounts in the range from 100 to 500 ppm, preferably up to 300 ppm, very particularly preferably up to 200 ppm, suffice for the stabilization. However, in the case of polyvinylpyrrolidone, it is advisable to add amounts greater than 500 ppm, in particular greater than 700, particularly preferably 1000 to 2500 ppm.

Besides uncrosslinked polyvinylpyrrolidone, suitable homopolymers and copolymers of N-vinylpyrrolidone are in principle all copolymers of N-vinylpyrrolidone with the following free-radically copolymerizable monomers:

Suitable monomers are, for example, acrylic acid and substituted acrylic acids, and salts, esters and amides thereof, where the substituents on the carbon atoms are in the two or three position of the acrylic acid, and independently of one another are chosen from the group consisting of $C_1$-$C_{20}$-alkyl, —CN, COOH, particularly preferably methacrylic acid, ethacrylic acid, acrylamide, methacrylamide, N,N-dimethylacrylamide and N,N-dimethylmethacrylamide.

Further suitable monomers are amides of acrylic acid and derivatives thereof, such as ethacrylamide, N-methylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-isopropylmethacrylamide, N-dodecylmethacrylamide, N-[3-(dimethylamino)propyl]methacrylamide, N-[3-(dimethylamino)propyl]acrylamide, N-[3-(dimethylamino)butyl]methacrylamide, N-[8-(dimethylamino)octyl]methacrylamide, N-[12-(dimethylamino)dodecyl]methacrylamide, N-[3-(diethylamino)propyl]methacrylamide, N-[3-(diethylamino)propyl]acrylamide, unsaturated sulfonic acids, such as, for example, acrylamidopropansulfonic acid; 3-cyanoacrylic acid.

Esters of acrylic acid and derivatives thereof, such as methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, stearyl(meth)acrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol(meth)acrylates, N,N-dimethylaminomethyl(meth)acrylate, N,N-diethylaminomethyl(meth)acrylate, N,N-dimethylaminoethyl(meth)acrylate, N,N-diethylaminoethyl(meth)acrylate, N,N-dimethylaminobutyl(meth)acrylate, N,N-diethylaminobutyl(meth)acrylate, N,N-dimethylaminohexyl(meth)acrylate, N,N-dimethylaminooctyl(meth)acrylate, N,N-dimethylaminododecyl(meth)acrylate, Other suitable monomers are vinyl and allyl esters of $C_1$-$C_{40}$ linear, $C_3$-$C_{40}$ branched-chain or $C_3$-$C_{40}$ carbocyclic carboxylic acids, such as vinyl acetate, vinyl propionate, and hydrolysis products thereof, such as vinyl alcohol, vinyl or allyl halides, preferably vinyl chloride and allyl chloride, vinyl ethers, preferably methyl, ethyl, butyl or dodecyl vinyl ethers, vinylformamide, N-vinyl-N-methylacetamide, vinylamine; methyl vinyl ketone; vinyllactams, preferably vinylpyrrolidone, vinylcaprolactam and vinylpiperidone, vinyl- or allyl-substituted heterocyclic compounds, preferably vinylpyridine, vinyloxazoline and allylpyridine, and vinylfuran and allyl alcohol.

Also suitable are N-vinylimidazoles in which $R^9$ to $R^{11}$, independently of one another, are hydrogen, $C_1$-$C_4$-alkyl or phenyl:

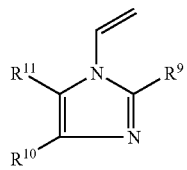

(III)

Examples are 1-vinylimidazol, 1-vinyl-2-methylvinylimidazol, 3-methyl-1-vinylimidazolium chloride and 3-methyl-1-vinylimidazolium methylsulfate.

Further suitable monomers are diallylamines of the general formula

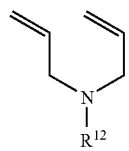

(IV)

where
$R^{12}$=$C_1$- to $C_{24}$-alkyl, for example diallyldimethylammonium chloride.

Further suitable monomers are maleic acid, fumaric acid, maleic anhydride and its half-esters and half-amides and imides, maleimide, crotonic acid, itaconic acid, vinyl ethers (for example: methyl, ethyl, butyl or dodecyl vinyl ethers), vinylidene chloride, and hydrocarbons with at least one carbon-carbon double bond, preferably styrene, alpha-methylstyrene, tert-butylstyrene, styrenesulfonic acid and salts thereof, butadiene, isoprene, cyclohexadiene, ethylene, propylene, 1-butene, 2-butene, isobutylene, vinyltoluene.

Of these, particular preference is given to acrylic acid, methacrylic acid, maleic acid, fumaric acid, crotonic acid, maleic anhydride, and its half-esters, and half-amides and imides, methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, stearyl acrylate, stearyl methacrylate, N-t-butylacrylamide, N-octylacrylamide, N-t-octylacrylamide, 2-hydroxyethyl acrylate, 2-hydroxypropyl acrylate, 2-2-hydroxyethyl methacrylate, 3-hydroxypropyl methacrylate, 3-hydroxypropyl acrylate, alkylene glycol(meth)acrylate, styrene, unsaturated sultonic acids and salts thereof, such as, for example, acrylamidopropanesulfonic acid and styrenesulfonic acid, vinylpyrrolidone, vinylcaprolactam, vinyl ethers (e.g.: methyl, ethyl, butyl or dodecyl vinyl ethers), vinylformamide, N-vinyl-N-methylacetamide, vinylamine, 1-vinylimidazol, 1-vinyl-2-methylimidazol, N,N-dimethylaminomethyl methacrylate and N-[3-(dimethylamino)propyl]methacrylamide; 3-methyl-1-vinylimidazolium chloride, 3-methyl-1-vinylimidazolium methylsulfate, N,N-dimethylaminoethyl methacrylate, N-isopropylmethacrylamide, N-[3-(dimethylamino)propyl] methacrylamide quaternized with methyl chloride, VCAp, VI, 1-vinyl-3-methylimidazolium salts, such as chloride and methylsulfate (QVI), VAC, (meth)acrylamide, dimethylaminoethyl(meth)acrylate and dimethylaminoethyl(meth)acrylamide and quaternized analogs thereof, diallyldimethylammonium chloride, vinyl alcohol (by hydrolysis from vinyl acetate after polymerization), VFA, vinylamine (by hydrolysis from VFA after polymerization), dimethylaminopropyl (meth)acrylate, dimethylaminopropyl(meth)acrylamide, (meth)acrylic acid, vinylpiperidone, N,N-dimethyl(meth)acrylamide, tert-butyl(meth)acrylamide, N-tert-octyl(meth) acrylamide, stearyl(meth)acrylamide, methyl, ethyl, butyl, tert-butyl(meth)acrylate, 2,3-dihydroxypropyl(meth)acrylate, N-isopropylacrylamide, vinyl propionate, 1-vinyl-2-methylimidazol, vinylpyridine, esters of (meth)acrylic acid or ethers of allyl alcohol and of polyethylene oxide or propylene oxide or poly(ethylene oxide co-propylene oxide) with a total of 2 to 200 EO or PO units or EO/PO units with methoxy group or hydroxy group on the end of the chain, methyl vinyl ether, hydroxyethyl(meth)acrylate, hydroxypropyl(meth) acrylate, vinyllactams, vinyloxazolines such as vinyloxazoline, vinylmethyloxazoline, vinylethyloxazoline, acrylamidopropanesulfonic acid, allyl alcohol.

Further suitable monomers are polyfunctional monomers such as triallylamine, trivinyl ether, divinylethyleneurea, 3-vinyl-N-vinylpyrrolidone, 4-vinyl-N-vinylpyrrolidone, 5-vinyl-N-vinylpyrrolidone, pentaeritrol triallyl ether, methylenebisacrylamide, butanediol diacrylate, hexanediol diacrylate, dipropyleneglycol diacrylate, allyl methacrylate, divinylbenzene, ethylene glycol dimethacrylate, triethylene glycol dimethacrylate and triethylene glycol divinyl ether.

Such monomers are usually used in small amounts of from 0.01 to 10% by weight and lead to crosslinking of the polymers.

Very particularly preferred comonomers are N-vinylcaprolactam (VCAp), N-vinylimidazole (VI), 1-vinyl-3-methylimidazolium salts (QVI), for example salts which are obtained by quaternization with methyl chloride or dimethyl sulfate, vinyl acetate, (meth)acrylamide, dimethylaminoethyl (meth)acrylate and dimethylaminoethyl(meth)acrylamide and quaternized analogs thereof, dialiyidimethylammonium chloride.

It is also possible to use copolymers which, besides VP, comprise mixtures of said comonomers, for example ter- or tetracopolymers. Thus, terpolymers of VP/VI/methacrylamide or VPVCap/VI terpolymers, for example, can be treated.

Accordingly, very particularly preferred copolymers are copolymers of N-vinylpyrrolidone (VP) with vinyl acetate with a VP/VAc weight ratio of from 20:80 to 80:20, for example 30:70, 50:50, 60:40, 70:30, with K values according to Fikentscher of from 20 to 100, also copolymers of VP and VI, for example with a VP/VI weight ratio of 1:1; copolymers of VP and VCap, for example with a weight ratio of 1:1, with K values according to Fikentscher of 20-100.

Preference is also given to copolymers of VP and 1-vinyl-3-methylimidazolium chloride (obtained by quaternization of 1-vinylimidazole with methyl chloride) with a weight ratio of VP/QVI of from 5:95 to 95:5, where the copolymers can have K values of from 10 to 100.

In particular, according to the invention, aqueous solutions of VP homopolymers with K values according to Fikentscher of from 10 to 130, for example K12, K15, K17, K25, K30, K60, K 80, K85, K90, K115, K 120, are also stabilized.

The polymer solutions usually have a solids content of from 5 to 80% by weight, preferably 10 to 60% by weight. It is possible to use solutions as they are obtained directly from the production of the polymers, or else also dissolve pulverulent polymers in water.

Hydrogen peroxide is used in the form of aqueous solutions with a content of from 5 to 70% by weight of H2O2, preferably 10 to 50% by weight.

To produce the solutions stabilized according to the invention, the aqueous polymer solutions are admixed with aqueous hydrogen peroxide and adjusted to the desired content.

The addition can take place at temperatures of from 10 to 95° C., preferably 20 to 85° C.

According to a preferred embodiment of the invention, the addition of the aqueous hydrogen peroxide to the polymer solutions takes place after the polymerization has concluded at elevated temperatures to the still-hot polymer solution, in particular at 70 to 100° C., particularly preferably 75 to 95° C., with stirring and subsequent cooling. This embodiment is preferred in particular in the case of solutions of polyvinylpyrrolidone.

To stabilize copolymers comprising QVI as comonomer, it is advisable to add hydrogen peroxide at temperatures of from 20 to 50° C.

Since an addition at elevated temperatures can lead to a degradation of the added hydrogen peroxide, it is advisable, using a few simple manual experiments, to ascertain the degradation at the desired storage temperature and to choose the amount of hydrogen peroxide so that, after cooling the polymer solutions and storage for two days, the desired content of hydrogen peroxide is present in the polymer solution. The content of hydrogen peroxide can, for example, be determined iodometrically through reduction of the peroxides with potassium iodide and subsequent potentiometric titration with thiosulfate solution. Another method of determining the peroxide content is potentiometric titration with cerium VI sulfate solution.

The aqueous hydrogen peroxide can be added under standard atmosphere. However, the addition preferably takes place under oxygen-reduced conditions, preferably <10% by volume, particularly preferably at <5% by volume oxygen. The protective gas used is preferably nitrogen.

The corresponding polymer solutions can be used for a large number of applications.

For example, they are suitable for use in cosmetic compositions for cleansing the skin. Such cosmetic cleansing compositions are chosen from bar soaps, such as toilet soaps, curd soaps, transparent soaps luxury soaps, deodorant soaps, cream soaps, baby soaps, skin protection soaps, abrasive soaps and syndets; liquid soaps, such as pasty soaps, soft soaps and washing pastes, and liquid washing, showering and bathing preparations, such as washing lotions, shower baths and gels, foam baths, oil baths and scrub preparations.

Preferably, the solutions according to the invention are used in cosmetic compositions for caring for and protecting the skin, in nail care compositions, and in preparations for decorative cosmetics.

Particular preference is given to the use in skincare compositions, intimate care compositions, foot care compositions, deodorants, photoprotective compositions, repellants, shaving compositions, hair removal compositions, antiacne compositions, make-up, mascara, lipsticks, eyeshadows, kohl pencils, eyeliners, blushers, powders and eyebrow pencils.

The skincare compositions are in particular in the form of W/O or O/W skin creams, day and night creams, eye creams, face creams, antiwrinkle creams, moisturizing creams, bleach creams, vitamin creams, skin lotions, care lotions and moisturizing lotions.

Depending on the field of application, the compositions according to the invention can be applied in a form suitable for skincare, such as, for example, as cream, foam, gel, stick, powder, mousse, milk or lotion.

Hair cosmetic preparations comprise in particular styling compositions and/or conditions in hair cosmetic preparations such as hair treatments, hair mousses, (hair) gels or hairsprays, hair lotions, hair rinses, hair shampoos, hair emulsions, end fluids, neutralizers for permanent waves, hair colorants and bleaches, hot-oil treatment preparations, conditioners, setting lotions or hairsprays. Depending on the field of use, the hair cosmetic preparations can be applied as (aerosol) spray, (aerosol) mousse, gel, gel spray, cream, lotion or wax.

A further field of application is oral care, i.e. toothpaste, mouthwashes, adhesive creams and the like.

The stabilized solutions can likewise also be used for pharmaceutical applications. They act firstly as thickeners, but secondly also as film formers. Besides use as catheter coatings, specific applications comprise use as wet binders, matrix retardants or coating retardants, e.g. for slow-release administration forms, gel formers, instant-release coatings and coating auxiliaries.

Furthermore, the stabilized polymer solutions are also suitable for the following applications:

Stripping and leveling auxiliaries for textile dyeing, enrichment/separation of (precious) metals and polyvalent cations, lightening agents (textile printing), recording media, concrete additives, binders for transfer printing, charge-transfer cathodes, coating of polyolefins, coatings, disinfectants and preservatives, diazotypes, dispersion auxiliaries, printing inks, electrically conductive layers, electrode gels and skin adhesion gels, recovery of petroleum from oil-containing water, increasing the wetability of surfaces, dyeing of polyolefins, diffusion-transfer materials, color transfer inhibitors, solid batteries (e.g. lithium batteries), solid electrolytes, fish food granules, fixators for perfume oils, flexographic printing plates, flocculants, auxiliaries in the photo industry (photographic processes, photo paper), precious metal crystallization germs for silver precipitation, gas analysis, plaster bandages, glass and glass fibers (binder, coating, lubricant), adhesion promoters for dyes, auxiliaries for the recovery of petroleum and natural gas and the transportation of petroleum and natural gas, inhibition of chlatrates, hydrophilization of surfaces, inkjet inks, printing inks and all point pen pastes, ion exchangers, isomerization inhibitor, catalysts, catheter coating, scale preventers or scale removers, ceramics (binder, thickener, solubility promoter, dispersant), adhesive for nutrient media, adhesive raw materials, adhesives and adhesive sticks, complexes with organic compounds such as albumin, antioxidants, polyphenols, phenols, tannins, enzymes, proteins and polymers, removal of tannin/phenols and polyphenols from liquids, complexes with inorganic compounds such as halogens, metals, metal salts and peroxides, such as organic peroxides and hydrogen peroxide, preservatives, contact lenses, corrosion protection, plastics additives, coating auxiliaries, photosensitive materials, lithography, solubility promoters (solubilization), air filters, membrane production, metal casting and metal hardening, metal colloids and their stabilization, metal complexes for reversible oxygen absorption, metal quenching baths, microencapsulation, oil and dye removal from water, oil recovery, paper auxiliaries (special papers, photo papers), colored paper slips, phase-transfer catalysts, photo imaging, pigment dispersions, proton conductors (anhydrous), waste water cleaners, rust preventers or rust removers of metallic surfaces, seed dressing and seed coating, lubricant additives, protective colloid, silver halide emulsions, slow-release fertilizer formulations, solubilizer for increasing the adsorbability/hydrophobicity, solubilization of hydrophobic substances, soil release, synthetic fibers, tertiary petroleum recovery, textile auxiliaries, inkjet recording media (inkjet papers and films), separation of hydrocarbon mixtures, improved dyeing of fibers, heat-resistant coats, heat-sensitive coats, heat-sensitive resistors, detergent additives, water-soluble films, cigarette filters.

Surprisingly, aqueous solutions of the specified polymers can be stabilized physically using just very small concentrations of hydrogen peroxide in the ppm range. Although some of the originally used hydrogen peroxide is decomposed upon prolonged storage or as a result of thermal stress, the polymer solutions remain stable. Upon further processing, the stabilizing effect is retained. It was likewise unexpected that despite the low concentrations of hydrogen peroxide, an adequate biocidal protective effect was also observed at the same time.

The color stabilization during thermal stress is also particularly advantageous.

Surprisingly, even at the relatively high $H_2O_2$ concentrations found and relatively high temperatures, no visible gelling arose.

EXAMPLES

Abbreviations used:
VP: N-vinylpyrrolidone
VCap: N-vinylcaprolactam
VAc: vinyl acetate
VI*MeCl: 1-vinyl-3-methylimidazolium chloride The viscosities were determined using a Brookfield viscometer at 23° C.

Example 1

Stabilization of an aqueous solution of a polyvinylpyrrolidone with a K value of 30 (of a 1% strength by weight aqueous solution) and a solids content of 30% by weight.

The polymer solution was adjusted to various hydrogen peroxide contents. The starting solutions were stored at 7° C. Further samples were stored for two days at 40° C. and then stored for 4 weeks at 7° C.

TABLE 1

| | Storage at 7° C. | |
|---|---|---|
| $H_2O_2$ content [ppm] | Viscosity (spindle 4/ 60 rpm) [mPas] | Iodine color number |
| untreated | 110-120 | 1.1 |
| 200 | 120 | 0.7 |
| 400 | 120 | 0.6 |
| 800 | 120 | 0.5 |
| 1500 | 120 | 0.4 |

TABLE 2

| | Storage at 40° C. | |
|---|---|---|
| $H_2O_2$ content [ppm] | Viscosity [mPas] | Iodine color number |
| untreated | 110-120 | 1.1 |
| 200 | 120 | 0.7 |
| 400 | 120 | 0.6 |
| 800 | 120 | 0.5 |
| 1500 | 120 | 0.4 |

After storage for 4 weeks, the samples were investigated according to the European Pharmacopeia for germ contamination. No germ contamination was established.

Example 2

Treatment of an aqueous solution of a copolymer of VP/VI*MeCl in the weight ratio 7:3, K value 45 (1% by weight in 3% strength by weight aqueous NaCl solution)

Starting Sample:

| Sample No. | $H_2O_2$ amount | Temperature [° C.] | Viscosity (sp. 3, 12 rpm) [mPas] | Iodine color number |
|---|---|---|---|---|
| 1 | — | 20 | 3355 | 1.8 |
| 2 | 150 ppm | 20 | 3289 | 1.7 |
| 3 | 300 ppm | 20 | 3259 | 1.7 |

Storage: 2 days at [° C.]

| Sample No. | $H_2O_2$ amount | Temperature [° C.] | Viscosity [mPas] | Iodine color number |
|---|---|---|---|---|
| 1 | — | 20 | 3429 | 1.6 |
| 2 | 150 ppm | 20 | 3349 | 1.4 |
| 3 | 300 ppm | 20 | 3379 | 1.4 |
| 1 | — | 40 | 3270 | 1.8 |
| 2 | 150 ppm | 40 | 3260 | 1.4 |
| 3 | 300 ppm | 40 | 3250 | 1.5 |

Example 3

Treatment of an aqueous solution of a copolymer of VP/VI in the weight ratio 1:1, K value 72 (1% strength by weight in water)

Starting Sample:

| Sample No. | H$_2$O$_2$ amount | Temperature [° C.] | Viscosity (sp. 3, 12 rpm) [mPas] | Iodine color number |
|---|---|---|---|---|
| 1 | — | 20 | 20 000 | 0.8 |
| 2 | 2000 ppm | 20 | 20 700 | 0.6 |

Storage: 2 days at [° C.]

| Sample No. | Temperature [° C.] | Viscosity [mPas] | Iodine color number |
|---|---|---|---|
| 1 | 20 | 20 800 | 0.8 |
| 2 | 20 | 21 700 | 0.5 |

Example 4

Treatment of an aqueous solution of a copolymer of VP and VCap in the weight ratio of 1:1, K value 65 (1% strength by weight in water)

Starting Sample:

| Sample No. | H$_2$O$_2$ amount | Temperature [° C.] | Viscosity (sp. 3, 10 rpm) [mPas] | Iodine color number |
|---|---|---|---|---|
| 1 | — | 20 | 30 300 | 0.8 |
| 2 | 2000 ppm | 20 | 28 500 | 0.8 |

Storage: 2 days at [° C.]

| Sample No. | Temperature [° C.] | Viscosity [mPas] | Iodine color number |
|---|---|---|---|
| 1 | 20 | 31 543 | 0.9 |
| 2 | 20 | 32 639 | 0.7 |
| 1 | 40 | 31 990 | 0.7 |
| 2 | 40 | 28 800 | 0.7 |

Example 5

Treatment of an aqueous solution of a copolymer of VP/VAc in the weight ratio 6:4, K value 30 (1% strength by weight ethanolic solution)

Starting Sample:

| Sample No. | H$_2$O$_2$ amount | Temperature [° C.] | Viscosity (sp. 3, 12 rpm) [mPas] | Iodine color number |
|---|---|---|---|---|
| 1 | — | 20 | 2920 | 0 |
| 2 | 2000 ppm | 20 | 2600 | 0 |

Storage: 2 days at [° C.]

| Sample No. | Temperature [° C.] | Viscosity [mPas] | Iodine color number |
|---|---|---|---|
| 1 | 20 | 3039 | 0 |
| 2 | 20 | 2859 | 0 |
| 1 | 40 | 2549 | 0 |
| 2 | 40 | 2529 | 0 |
| 1 | 80 | 2240 | 0 |
| 2 | 80 | 1790 | 0 |

Example 6

Starting from an aqueous solution of polyvinylpyrrolidone K30, gels with a content of PVP of 3% by weight and a content of carbomer of 0.5% by weight were produced. The PVP solutions were stabilized with varying contents of hydrogen peroxide. For comparison, a gel with an untreated PVP solution was produced. After storage for 4 weeks at 25° C., the gels were assessed with regard to their physical properties. It was found that stabilization with hydrogen peroxide had no negative effects on the later use.

Starting Samples:

| H$_2$O$_2$ content | Appearance | pH | Odor |
|---|---|---|---|
| 1090 ppm | virtually clear | 6.9 | of carbomer |
| 1310 ppm | virtually clear | 7.05 | of carbomer |
| — | virtually clear | 7.6 | of carbomer |

After Storage:

| Appearance | pH | Odor | Viscosity [mPas] |
|---|---|---|---|
| virtually clear | 6.9 | of carbomer | 32 400 |
| virtually clear | 7.0 | of carbomer | 34 100 |
| virtually clear | 7.55 | of carbomer | 34 050 |

We claim:

1. An aqueous solution comprising: one or more polymeric components selected from the group consisting of homopolymers of N-vinylpyrrolidone, copolymers of N-vinylpyrrolidone, and mixtures thereof; and hydrogen peroxide, wherein the hydrogen peroxide is present in the solution, upon storage of at least two days, in an amount up to 5000 ppm.

2. The aqueous solution according to claim 1, wherein the one or more polymeric components comprises a polyvinylpyrrolidone.

3. The aqueous solution according to claim 2, wherein the hydrogen peroxide is present in an amount of 1000 to 2500 ppm.

4. The aqueous solution according to claim 1, wherein the one or more polymeric components comprises a copolymer of N-vinylpyrrolidone having an N-vinylpyrrolidone monomer content of at least 20% by weight based on the copolymer.

5. The aqueous solution according to claim 1, wherein the one or more polymeric components comprises a copolymer of N-vinylpyrrolidone and one or more comonomers selected from the group consisting of methacrylamide, vinylcaprolactam, vinylimidazole, 1-vinyl-3-methylimidazolium salts, and vinyl acetate.

6. The aqueous solution according to claim 1, wherein the one or more polymeric components comprises a copolymer of at least N-vinylpyrrolidone and vinyl acetate having a weight ratio of N-vinylpyrrolidone to vinyl acetate of 20:80 to 80:20.

7. The aqueous solution according to claim 1, wherein the one or more polymeric components comprises a copolymer of at least N-vinylpyrrolidone and N-vinylimidazole having a weight ratio of N-vinylpyrrolidone to N-vinylimidazole of 20:80 to 80:20.

8. The aqueous solution according to claim 1, wherein the one or more polymeric components comprises a copolymer of at least N-vinylpyrrolidone and a 1-vinyl-3-methylimidazolium salt having a weight ratio of N-vinylpyrrolidone to 1-vinyl-3-methylimidazolium salt of 5:95 to 95:5.

9. A method comprising:
   (a) providing one or more polymeric components selected from the group consisting of homopolymers of N-vinylpyrrolidone, copolymers of N-vinylpyrrolidone, and mixtures thereof; and
   (b) combining the one or more polymeric components in an aqueous solution with hydrogen peroxide, wherein the hydrogen peroxide is present in a starting amount of 100 to 5000 ppm.

10. The method according to claim 9, wherein the combining is carried out at a temperature of 10 to 95° C.

11. The method according to claim 9, wherein the one or more polymeric components comprises a polyvinylpyrrolidone.

12. The method according to claim 9, wherein the one or more polymeric components comprises a copolymer of N-vinylpyrrolidone having an N-vinylpyrrolidone monomer content of at least 20% by weight based on the copolymer.

13. A method comprising:
   (a) providing an aqueous solution comprising one or more polymeric components selected from the group consisting of homopolymers of N-vinylpyrrolidone, copolymers of N-vinylpyrrolidone, and mixtures thereof; and
   (b) adding hydrogen peroxide to the aqueous solution such that the hydrogen peroxide is present in the aqueous solution in a starting amount of 100 to 5000 ppm.

14. The method according to claim 13, wherein the combining is carried out at a temperature of 10 to 95° C.

15. The method according to claim 13, wherein the one or more polymeric components comprises a polyvinylpyrrolidone.

16. The method according to claim 13, wherein the one or more polymeric components comprises a copolymer of N-vinylpyrrolidone having an N-vinylpyrrolidone monomer content of at least 20% by weight based on the copolymer.

17. The aqueous solution according to claim 1, wherein the hydrogen peroxide is present in an amount of 100 to 5000 ppm.

18. The aqueous solution according to claim 1, wherein the hydrogen peroxide is present in an amount of 100 to 2500 ppm.

19. The aqueous solution according to claim 1, wherein the amount of hydrogen peroxide is measured iodometrically by reduction of the peroxide with potassium iodide and subsequent potentiometric titration with a thiosulfate solution.

20. The aqueous solution according to claim 1, wherein the amount of hydrogen peroxide is measured by potentiometric titration with a cerium (VI) sulfate solution.

21. The aqueous solution according to claim 9, wherein the amount of hydrogen peroxide is measured iodometrically by reduction of the peroxide with potassium iodide and subsequent potentiometric titration with a thiosulfate solution.

22. The aqueous solution according to claim 9, wherein the amount of hydrogen peroxide is measured by potentiometric titration with a cerium (VI) sulfate solution.

23. The aqueous solution according to claim 13, wherein the amount of hydrogen peroxide is measured iodometrically by reduction of the peroxide with potassium iodide and subsequent potentiometric titration with a thiosulfate solution.

24. The aqueous solution according to claim 13, wherein the amount of hydrogen peroxide is measured by potentiometric titration with a cerium (VI) sulfate solution.

* * * * *